United States Patent Office 3,379,610
Patented Apr. 23, 1968

3,379,610
COMPLEX METAL SALTS OF MANGANESE ETHYLENEBISDITHIOCARBAMATE
Channing Bruce Lyon, Abington, Joseph W. Nemec, Rydal, and Victor H. Unger, Willow Grove, Pa., assignors to Rohm & Haas Company, Philadelphia, Pa., a corporation of Delaware
No Drawing. Filed May 9, 1961, Ser. No. 108,735
19 Claims. (Cl. 167—22)

This invention concerns a process for preparing complex metal salts of maneb, manganese ethylenebisdithiocarbamate, and also concerns the products thereby prepared. These products are particularly useful as agents for combating plant diseases caused by fungi.

After the discovery by W. F. Hester of the fungicidal value of salts of ethylenebisdithiocarbamic acid, such compounds as zinc, iron, and manganese ethylenebisdithiocarbamates came into world-wide use in agriculture and horticulture for controlling a variety of plant diseases. Nevertheless, the quest has continued for agents which are effective for controlling plant diseases at minimum rates of application or which remain effective over increased periods of time or which are at least as safe or preferably safer on living plants than presently available fungicides or which will control a wider spectrum of fungal diseases or which possess a combination of these desirable properties.

Products which achieve one or more of such objectives are available through the process of this invention. To prepare the products, an aqueous slurry of maneb (the accepted common name for the water-insoluble manganese salt of ethylenebisdithiocarbamic acid) is reacted with a water-soluble salt of a polyvalent metal such as zinc, copper, iron, and cobalt. Of these, the preferred salts are the zinc, ferric, and cobaltous. Rather surprisingly, the copper-complexed maneb is not as desirable as the preferred complexes, although it does show improved fungicidal action. To effect reaction, maneb, water, and metal salt or mixture of metal salts are brought together between about 10° and about 50° C. The mixture may then be dried. The metal ions are taken up, reacted with, or complexed by the maneb and a new kind of compound of the metal and maneb is formed.

The new products of this invention are water-insoluble complex metal bisdithiocarbamates, which give on analysis between 38% and 57.4% of carbon disulfide, have an X-ray powder diffraction diagram with lines with relative intensities at 8.04 A. (strong), 6.91 A. (medium), 6.51 A. (medium), 4.46 A. (medium to strong), and 3.03 A. (strong), containing from 13.8% to 20.7% of manganese, and contain by analysis a metal from the class consisting of cobalt, copper, iron, and zinc, the percentage of cobalt being about 0.25% to 9%, copper being about 0.2% to 2.5%, iron being about 0.1% to 33%, and zinc being about 0.1% to 6.6%. These are the ranges of added metal which provide improved properties in the complex product.

In addition to the above-noted X-ray diffraction lines which are designated as medium to strong and which are definitive of the structure of the complexes, there may be observed in some preparations very weak lines at 4.15 A., 4.04 A., 3.32 A., and 3.21 A. but these are not necessary for purposes of identification.

When the above-noted metals are used in preferred proportions, the complex products will contain 0.4% to 5.6% of cobalt, 0.5% to 1% of copper, 0.6% to 23% of iron, and 0.2% to 2.9% of zinc. These proportions tend to give the optimum improvements in various properties.

The carbon disulfide content depends upon the amount of metal added to form the complex and also upon the purity of the product.

The reaction is most conveniently carried out with an aqueous slurry of maneb by mixing it with the metal salt or mixture of metal salts or with an aqueous solution of the metal salt or salts. Similarly, powdered maneb may be mixed with an aqueous solution of the salt or salts to form a slurry.

The amount of water present at this point is primarily a matter of convenience and practical handling. Where drying follows reaction, it is, of course, desirable to have present merely enough water to ensure adequate mixing of reactants and uniformity of product. This minimum depends in part upon the particular nature or state of the maneb, which may be in the form of a slurry as obtained from its precipitation from reacting in water a soluble manganese salt, such as manganous sulfate, chloride, or nitrate and a water-soluble salt of ethylenebisdithiocarbamic acid, such as the lithium, sodium, potassium, calcium, magnesium, ammonium, or quaternary ammonium salts. As is known, such precipitation does not occur when the concentration of ethylenebisdithiocarbamate in water is less than about 2%, since the manganese salt which forms by interaction is a soluble salt, probably the cyclic salt, a monomeric form. At least 5% of slurry is necessary to ensure formation of a chain of manganese and acid ions. The maneb as thus obtained is in hydrated form. It may be used as such or it may be washed and it may be partially or completely dehydrated.

In general, the proportion of maneb, hydrated or dried, to water is about 5:95 to 65:35 by weight and preferably about 40:60 to 60:40.

Reaction between metal salt and maneb in water takes place in a relatively short time. In general, times from about ten minutes to about five hours allow for essential completion of the reaction. These times represent the period within which salt in solution is in contact with maneb in suspension before the reaction product is used, isolated, or dried. In a continuous process wherein salt, water, and maneb are continuously mixed and the resulting product is separated and/or dried, the residence time is within the stated time limits.

The reaction product may be separated as by filtering or centrifuging and may then be dried below decomposition temperatures. If desired, the filtered or centrifuged product may be washed before drying. On the other hand, the entire reaction mixture may be dried, leaving, of course, soluble salts in the product thus obtained.

Drying may be accomplished under normal or reduced pressure. Spray drying may be practiced or vacuum drum drying or tray drying. For example, the reaction product is desirably dried between 40° and 85° C. under reduced pressures, desirably at pressures of 5 to 30 mm. (Hg). In spray drying inlet gas temperatures up to about 600° F. may be used, but under these conditions the temperature of drying particles remains well below the decomposition point. Under any of the drying conditions, the temperature of the product is below 90° C.

After the product has been dried, it may be desired to render the product more finely divided, as by grinding or sieving. For this purpose, there may be used Mikropulverizing, micronizing, crushing, and screening, or other comminuting step. To ensure finely divided products, there may be utilized at one or more stages of preparation a dispersing agent, such as sodium lignin sulfonate, sodium naphthalene-formaldehyde sulfonate, or sodium dioctylsulfosuccinate.

If desired, a stabilizing agent may be admixed with the metal-complexed maneb as by addition of hexamethylenetetramine to the slurry to be dried or to the dried product.

Soluble salts of the above-noted metals include chlorides, nitrates, acetates, and sulfates. Convenient salts are zinc chloride, zinc sulfate, zinc nitrate, zinc acetate, ferrous sulfate, ferric chloride, ferric nitrate, ferric sulfate, cobalt chloride, cobalt sulfate, cobalt nitrate, cupric sulfate, cupric chloride, cupric acetate, and cupric nitrate. Salts may be used in any of the usual forms, including hydrated forms, and may be used as such or as solution. As above indicated, mixtures of salts or solutions of several salts may be used, such as cobalt and zinc salts or copper and zinc salts.

When the maneb and added metal salt are brought together in water under specified conditions, a reaction occurs whereby the metal ion is taken up by the maneb. The X-ray diagram for the reaction product has lines shown above and lacks lines which would correspond to the ethylenebisdithiocarbamate of the added metal. Hence, the product is not a mixture of maneb and another ethylenebisdithiocarbamate. Furthermore, the new product has some properties differing from those of the salt of ethylenebisdithiocarbamic acid corresponding to that formed with the added metal salt and also from those of maneb.

The proportions of added metal salts which provide the development of significant desirable properties vary somewhat from metal to metal. Since there may be used any soluble salt of these metals, it is most convenient in defining steps of preparation to express the proportion of reacting salt to maneb in terms of the percent of metal ion by weight based on weight of maneb. The effect of zinc ions and development of new properties begins to be noticeable with about 0.1% of zinc ion based on weight of maneb and desirable properties of the complex are noticed up through about 7% of zinc ion. The preferred proportions of zinc, however, are 0.2% to 3% of zinc ion. The optimum proportion of zinc ion depends in minor degree upon the particular preparation of maneb and also upon whether it is in hydrated or dried form. In any case, the proportions of metal ion will be those providing enhanced disease control with minimum harm to plants within the above limits. The proportions for copper are from about 0.2% to about 2.5% with 0.5% to 1.0% preferred, calculated as copper ion based on the weight of maneb. With ferric salts the limits are from 0.1% to 10% with 0.6% to 4.0% preferred. Ferrous salts appear to develop a complex at 1% to 50% of ferrous ion, preferably between 10% and 30%, but changes other than complex formation occur with the ferrous ion including its oxidation. With cobalt, the limits are 0.25% to 10% of cobaltous ion, with 0.4% to 6% preferred.

The following examples present typical preparations of reaction products of this invention. Parts are by weight unless otherwise designated.

Example 1

There were reacted equimolar amounts of disodium ethylenebisdithiocarbamate and manganous chloride in concentrated aqueous solution. A precipitate formed which was washed by decantation three times to give an aqueous slurry containing 38% of hydrated manganese ethylenebisdithiocarbamate. A portion of 800 parts of this slurry was mixed with a separately prepared solution of 24.5 parts of zinc nitrate hexahydrate in 25 parts of water. The resulting mixture was stirred for one-half hour at 30° C. and was spray dried, the inlet gas temperature being 280° C. and the outlet temperature 125° C. The dry solid which formed was micronized. Product collected amounted to 272 parts.

By analysis this product contained 47.5% of carbon disulfide, 17.3% of manganese, and 1.7% of zinc. It is a complex salt in which maneb is modified by reaction with zinc ions. It shows the typical X-ray lines enumerated above.

Example 2

A slurry was prepared from 400 parts of a commercial maneb and 250 parts of water. This commercial material by carbon disulfide analysis contained 352 parts of manganous ethylenebisdithiocarbamate. To the agitated slurry were added 27.5 parts of zinc sulfate monohydrate and 50 parts of water. The mixture was stirred for an hour at 28° to 31° C. and then dried under reduced pressure. The maximum temperature reached was 80° C. while the pressure was reduced to 20 mm. The dried batch was cooled to about 40° C. and the drier was vented with nitrogen before discharge.

The dried product was Mikropulverized using a 0.02 inch herringbone screen with six hammers operating at 6,950 r.p.m. The product amounted to 367 parts and contained by analysis 46.9% of carbon disulfide, 18.9% of manganese, and 2.7% of zinc.

X-ray studies of the products prepared in the above examples show that the product is not a mixture of maneb and zineb. Infrared absorption curves have lines not occurring with pure zineb and mixtures of zineb and maneb. The products are complex zinc-containing manganese ethylenebisdithiocarbamates.

When zinc is used as the complexing metal, the water-insoluble product will contain from 19.2% to 20.7% of manganese. When the product as made contains non-manganese containing impurities such as water-soluble salts, the percent of manganese will, of course, appear proportionately less. The carbon disulfide content of the zinc complex as such will vary from about 53% to 57.4%. When impurities are present, as when salts are not washed out, carbon disulfide analyses may be as low as 42%.

Example 3

Manganese ethylenebisdithiocarbamate was prepared by mixing a concentrated aqueous solution of disodium ethylenebisdithiocarbamate and a concentrated aqueous solution of manganous sulfate, filtering off the resulting precipitate, washing it with water, washing it with methanol, and drying the resulting solid at ambient temperatures. There were mixed 635 parts of this solid, 650 parts of water, and a solution of 24.8 parts of cupric sulfate pentahydrate in 30 parts of water. This mixture was agitated for two hours at 27° to 30° C. Pressure on the reaction mixture was reduced to 12 mm. and later to 8 mm., while the temperature thereof was raised to 75° C. A solid product was thus obtained in an amount of 522 parts. It contained by analysis 48.3% of carbon disulfide, 19.9% of manganese, and 1.1% of copper.

The product is a complex copper-manganese salt of ethylenebisdithiocarbamic acid, as shown by infrared and X-ray data. The water-insoluble copper-complexed maneb yields 56% to 57.2% of carbon disulfide while the crude reaction product may yield from 44% upwards.

Example 4

There were mixed 200 parts of a 50% slurry of precipitated manganese ethylenebisdithiocarbamate dihydrate in water and 5.5 parts of zinc sulfate monohydrate at 25° to 30° C. The mixture was agitated for two hours. It was then charged to a vacuum drier. Pressure was reduced to 28 mm. and temperature of the batch was raised gradually to 76° C. The product was cooled to about 30° C. and then ground to pass a 325 mesh screen. The product contained 48.2% of carbon disulfide, 17.5% of manganese, and 1.9% of zinc. X-ray and infrared data show this product to be a complex zinc-manganese salt of ethylenebisdithiocarbamic acid.

Example 5

A suspension was prepared from 5 parts of a commercial maneb containing 85% manganese ethylenebisdithiocarbamate by analysis for carbon disulfide and 95 parts of water. To this suspension was added one part of zinc sulfate heptahydrate. The mixture was stirred for two hours at 24° to 27° C. The reaction mixture was then spray dried with gas inlet temperatures of 280°–290° C. and outlet temperature of about 125° C. The product was finely particled solid which was passed through a 325 mesh screen to give 4.2 parts of a complex zinc-manganese salt of ethylenebisdithiocarbamic acid. The product contained 4.3% of zinc and 48% of carbon disulfide.

The above procedure is repeated with use of one-half part of zinc sulfate heptahydrate and one part of cobalt nitrate hexahydrate. The product is a complex containing 3.8% of cobalt, 2.1% of zinc, 16.1% of manganese, and 45% of carbon disulfide.

Example 6

Pure manganese ethylenebisdithiocarbamate dihydrate was suspended in aqueous 70% methanol to give a 37% slurry. There were mixed 100 parts of this slurry and 1.2 parts of aqueous 70% zinc chloride solution. The mixture was agitated at 30° C. for an hour. Water and methanol were removed by heating the mixture under reduced pressures, the temperature being about 75° C. and the pressure being reduced to 3 mm. The product was carfully leached of soluble salts and dried under reduced pressure at 50° C. the product was Mikropulverized. It was demonstrated to be essentially free of soluble zinc salt or zineb and was a complex salt of zinc and manganese ethylenebisdithiocarbamate. This product contained 0.9% of zinc, 20.4% of manganese, 56% of carbon disulfide, 17.8% of carbon, 2.2% of hydrogen, and 10.2% of nitrogen.

Example 7

Commercial maneb was used. By carbon disulfide analysis it contained 81.4% of manganese ethylenebisdithiocarbamate. Over a period of one hour 4300 parts of this material were added with stirring to a solution of 231 parts of cobalt chloride hexahydrate in 5050 parts of water. The resulting suspension was stirred for two hours at 31°–33° C. It was spray dried with an average temperature of inlet gas of 286° C. and an average outlet temperature of 123° C. The dry product was pulverized in an air mill to give 3340 parts of a complex cobalt-containing manganese ethylenebisdithiocarbamate, containing by analysis 47.1% of carbon disulfide, 17.4% of manganese, and 1.3% of cobalt. This product is a complex cobalt-containing manganese ethylenebisdithiocarbamate.

When the entire reaction product is thus dried, the carbon disulfide analysis may be as low as 41.9% assuming the starting maneb is about 80% active. When soluble salts are leached, the final product contains 52.3% to 57.2% of carbon disulfide.

When the starting maneb is of about 80% purity and the entire reaction mixture is dried, the carbon disulfide content varies from 41.9% to 45.9%. When purified maneb is used and soluble salts are removed, the product contains 52.3% to 57.3% of carbon disulfide.

Example 8

Pure manganese ethylenebisdithiocarbamate dihydrate was heated at 63° to 67° C. in a vacuum tray drier at one to 1.5 mm. pressure for 8 hours and was thus converted to the anhydrous form. A portion of 10 parts of this dried maneb was slurried in a solution of 0.5 part of zinc sulfate in 10 parts of water. This slurry was stirred for an hour at 25° to 30° C. and then vacuum tray dried for 27 hours. The drier was heated with water maintained at 75° C. and the pressure therein was 6 to 15 mm. The dried material was passed through a 325 mesh screen to yield 9.1 parts of a complex zinc-containing manganese ethylenebisdithiocarbamate. This product was washed with water and with methanol and dried at 50° C. at 5 mm. pressure. This product contained 1.9% of zinc, 20.3% of manganese, 56% of carbon disulfide, 17.6% of carbon, 2.3% of hydrogen, and 10.2% of nitrogen.

Example 9

To an agitated slurry of 532 parts of commercial maneb (85% manganese ethylenebisdithiocarbamate) in 368 parts of water was added a solution of 37.2 parts of zinc sulfate monohydrate in 67 parts of water. The mixture was agitated for four hours at 28° to 33° C. The mixture was filtered on a vacuum filter, the collected solids were washed with water, and the filter cake was dried for eleven hours in a vacuum oven at 75° C. and 6 to 15 mm. pressure. The dry material was Mikropulverized in a hammer mill equipped with a 0.02 inch herringbone sieve, a corrugated dome, and six hammers operating at 6,950 r.p.m. The final product amounted to 493 parts. It gave by analysis 47.3% of carbon disulfide, 19.1% of manganese, and 2.4% of zinc. It gave the X-ray and infrared lines typical of the complex salts based on maneb.

Example 10

Freshly precipitated manganese ethylenebisdithiocarbamate dihydrate was washed with water and methanol and dried at room temperature. There was slurried a portion of 30 parts this material and 70 parts of water. Thereto was added 1.1 part of ferric nitrate hexahydrate. The mixture was stirred at 30°–35° C. for two hours. The solid was filtered off, washed, and dried in a vacuum oven at 70° C./5 mm. for ten hours. The product comprised 24.6 parts of iron-manganese complex salt of ethylenebisdithiocarbamic acid, containing 52.5% of carbon disulfide, 20.2% of manganese, and 0.6% of iron.

The carbon disulfide content of ferric-complexed maneb usually is 52.3% to 57.4%, while, when commercial maneb is used and the reaction product is dried, as by spray drying, the carbon disulfide content may be as low as 41%.

When ferrous salts are used to complex maneb, the products may vary in carbon disulfide content from 30.8% to 56.9%, because of the considerable range in proportions of ferrous ions which may be complexed to provide improved properties. When pure maneb is used and soluble salts are removed, the carbon disulfide varies from 38.5% to 56.9%.

The unique nature of the complex salts herein described may be most readily seen from biological data. The first biological test here discussed is the "persistency test," in which (1) test plants, here tomato plants, are sprayed to run-off with suspensions of agents under evaluation in a dosage series, (2) the sprayed plants are dried, (3) the dried plants are subjected to a flow of finely atomized water for 16 hours, (4) the plants are dried again, (5) the plants are illuminated for four days, (6) the plants are inoculated with a suspension of 30,000 spores per milliliter of *Phytophthora infestans*, (7) plants are held at 52°–55° F. and 100% relative humidity (to incubate spores) for about 22 hours, (8) plants are stored in light for 42 hours, and (9) counts of lesions are made. From the counts at the different dosages there are now calculated the $ED_{50}$ values; that is, the dosage in parts per million of agent giving 50% control.

This method of evaluation was used with zineb, maneb, mixtures of maneb and zineb, and complex zinc-manganese ethylenebisdithiocarbamates, one made by reacting maneb with 7% of its weight of zinc sulfate monohydrate (A) and the other with 3.5% of its weight of the same zinc salt (B). Test data are summarized in Table I, using tomato plants.

TABLE I.—$ED_{50}$ VALUES FOR PERSISTENCY TESTS ON TOMATOES WITH PHYTOPHTHORA INFESTANS

| Compound | $ED_{50}$ |
|---|---|
| Zineb | 1132 |
| Maneb | 360 |
| Mixtures [1] | 400 |
| A | 162 |
| B | 183 |

[1] Mixtures were maneb containing zineb equivalent to the zinc used in preparing A and B, approximately the same value being found for the two mixtures.

These tests show the complex salts to be much more effective against *Phytophthora infestans* on tomatoes than the single salts or a mixture of these salts.

In another set of persistency tests $ED_{50}$ values were obtained for zineb, maneb, mechanical mixtures of zineb and maneb, and the complex salt formed by reacting maneb with 10% of its weight of zinc sulfate monohydrate (C). Results are summarized in Table II.

TABLE II.—$ED_{50}$ VALUES FOR LATE BLIGHT ON TOMATOES

| Ratio of Zineb to Maneb: | $ED_{50}$ |
|---|---|
| 1:0 | 1109 |
| 4:1 | 675 |
| 2:1 | 417 |
| 1:1 | 407 |
| 1:2 | 356 |
| 1:4 | 345 |
| 0:1 | 322 |
| Complex C | 179 |

Late blight persistency data were obtained on a complex cobalt-manganese ethylenebisdithiocarbamate made by reacting maneb with 3% of its weight of cobalt nitrate hexahydrate (D), a complex copper-manganese ethylenebisdithiocarbamate made by reacting maneb with 5% of its weight of cupric nitrate trihydrate (E), a complex iron-manganese ethylenebisdithiocarbamate made by reacting maneb with 50% of its weight of ferrous sulfate heptahydrate (F), and a complex iron-manganese ethylenebisdithiocarbamate made by reacting maneb with 10% of its weight of ferric nitrate nonahydrate (G). The results are given in Table II A in terms of $ED_{50}$ values. In the same set of tests comparison was made with the same lot of maneb used for preparation of above metal complexes.

TABLE II A.—$ED_{50}$ VALUES FOR LATE BLIGHT ON TOMATOES

| Agent: | $ED_{50}$ |
|---|---|
| Complex D | 187 |
| Complex E | 217 |
| Complex F | 173 |
| Complex G | 172 |
| Maneb | 244 |

Stability tests on foliage also establish differences for the complex salts formed from maneb by reaction with a metal salt such as shown above. In this test plants are sprayed with suspensions of the compounds under study, usually at several rates of application. The treated plants are stored under favorable conditions in a greenhouse with water applied only to the soil in which the plants are growing. A leaf is taken at each test date and a disc cut therefrom, the disc being 20 mm. in diameter. The disc is placed in an agar plate seeded with spores of Endomycopsis spp. The plate is incubated and the zone of inhibition measured.

Results are summarized in Table III.

TABLE III

| Compound | Rate, lb./100 gal. | Zone of Inhibition, in mm. | | | | | |
|---|---|---|---|---|---|---|---|
| | | On Tomatoes | | | On Cucumbers | | |
| | | 1 Day | 8 Days | 15 Days | 1 Day | 8 Days | 15 Days |
| Maneb | 0.75 | 35 | 30 | 21 | 39 | 33 | 23 |
| | 0.375 | 31 | 21 | 21 | 33 | 27 | 21 |
| Complex A | 0.75 | 34 | 33 | 30 | 34 | 35 | 31 |
| | 0.375 | 31 | 28 | 27 | 32 | 33 | 26 |
| Complex B | 0.75 | 36 | 36 | 30 | 37 | 37 | 34 |
| | 0.375 | 32 | 28 | 26 | 35 | 33 | 29 |

These data show that although at the beginning of the test all compounds had about the same activity, Complex A and Complex B retained a greater degree of biological activity with passage of time and growth of the plant.

The above results are representative for the various metal complexes formed from maneb by reaction with zinc, iron, cobalt, and copper salts within the proportions set forth above.

Stability tests were conducted by spraying plastic discs with aqueous dispersions of modified complexed manebs reacted with metal salts, drying the sprayed discs, subjecting them to ultraviolet illumination, and measuring the zone of inhibition in agar plates seeded with Endomycopsis spp. The data establish markedly less deterioration in films of the complexed manebs than in films from maneb itself.

Comparisons were also made for various complexes from maneb with iron, cobalt, copper, and zinc against a mixture of 30% of commercial maneb and 70% of zinc ethylenebisdithiocarbamate, zineb (Mix Z). The various complexes and compounds were applied in sprays to field grown cucumber plants for control of downy mildew (*Pseudoperonospora cubensis*). A four-day spray schedule was followed. Applications were made at 0.75 lb. and 1.5 lbs. per 100 gallons. Readings were made about one month after the start of the spray schedule, the number of lesions being counted for 20 leaves picked at random.

The average counts obtained are recorded in Table IV.

TABLE IV.—CONTROL OF DOWNY MILDEW ON CUCUMBERS

| Agent | Lesions per 20 Leaves | | |
|---|---|---|---|
| | At 0.75 lb. | At 1.50 lbs. | Mean Value |
| Complex A | 28 | 8 | 15 |
| Complex B | 32 | 16 | 22 |
| Maneb | 73 | 22 | 45 |
| Mix Z | 65 | 20 | 42 |

Essentially the same values as shown for Complex A and Complex B are obtained with a complex formed from maneb and other metal ions shown above.

The control obtained with Complex A is matched with complexes formed by reacting 1% to 3% of cobalt nitrate hexahydrate and maneb in a slurry according to methods shown in the examples, or 10% of ferric nitrate nonahydrate and maneb in a slurry, or 3% of cupric nitrate trihydrate and maneb in a slurry.

The effectiveness of some of the complexes was well demonstrated with tests for controlling *Cercospora apii* on celery plants. After about seven weeks from the time of setting out celery plants in the field, a nine-day spray schedule was followed with maneb, zineb, the complex formed by reacting maneb with 5% of its weight of zinc sulfate monohydrate in a slurry (H), and the complex formed by reacting maneb with 7% of its weight of copper sulfate pentahydrate (I). After 63 days of this spray schedule, counts of Cercospora lesions were made on leaflets selected at random. The counts here are based on the number of lesions on 25 leaflets. With maneb at 1.5 lbs. per 100 gallons, the number of lesions was 121; with zineb at 1.5 lbs per 100 gallons, 109; with Complex H at 1.5 lbs. per 100 gallons, 56; and with Complex I at 1.5 lbs. per 100 gallons, 50.

Parallel with the above, test plots of celery plants were subjected to the same spray schedules, but natural rainfall was supplemented with overhead sprinkler irrigation. Under these conditions, counts were as follows: maneb, 134; zineb, 84; Complex H, 18, and Complex I, 24.

Favorable results are also obtained in combating *Septoria apii* on celery, Botrytis spp. on strawberries, *Colletotrichum lindemuthianum* and *Uromyces phaseoli* on beans, and *Alternaria solani* on tomatoes or potatoes.

In greenhouse tests the complexes of this invention were found to be generaly less phytotoxic than the conventional manganese salt of ethylenebisdithiocarbamic acid. These tests were conducted with tender, succulent tomato plants about one month old at the three-true-leaf stage. Such plants in the greenhouse are particularly susceptible to damage from applied chemicals and similar differential phytotoxic responses have been observed in the field. With this test it has been found that maneb causes measurable injury when applied at 0.5 lb. per 100 gallons. The complex salts formed with zinc ion have produced no injury when applied at 0.5 lb., 1.0 lb., and 2.0 lbs. per 100 gallons.

As indicated above, the metal-complexed maneb preparations can be used in essentially pure form from which water-soluble impurities have been leached or in their relatively crude form. They can be used in any manner comparable to the way in which maneb or zineb is presently used, such as conventional high-gallonage hydraulic sprays, low-gallonage sprays, airblast sprays, aerial sprays, and dusts. The dilution and rate of application of the metal-complexed maneb will depend upon the type of equipment employed, the method of application, and the diseases to be controlled, but the amount is usually one-half to five pounds per acre per application in aqueous sprays in volumes from five to 175 gallons. If desired, small amounts of wetting agents and/or sticking agents may be added to the spray mixtures.

A dust is prepared by blending six parts of cobalt-complexed maneb containing 4% of cobalt with 24 parts of calcium carbonate and then mixed with 70 parts of micronized sulfur. In another formulation, 10 parts of zinc-complexed maneb containing 2.5% of zinc is thoroughly mixed with 90 parts of calcium carbonate.

The metal-complexed manebs can be used in conjunction with other pesticides and with nutritional sprays. They can be used with other fungicides such as dinitro(1-methylheptyl)phenyl crotonate (Karathane), N-trichloromethylthiotetrahydrophthalimide (captan), sulfur, N-dodecylguanidine acetate (dodine), fixed coppers, fungicidal oils, and antibiotics. They can be used with insecticides such as DDT, benzene hexachloride, phosphatics such as parathion and malathion, rotenone, lead arsenate, and 1-naphthyl N-methylcarbamate, and with miticides such as 1,1-bis(p - chlorophenyl) - 2,2,2-trichloroethanol (Kelthane) and 2,4,4',5-tetrachlorphenyl sulfone.

Maneb is the given common name for the well-known relatively insoluble fungicide, manganese ethylenebisdithiocarbamate. As is known, there are several forms of manganese ethylenebisdithiocarbamate, one of which is soluble in water. The relatively insoluble version is formed as a precipitate when a soluble manganese salt and a soluble salt of ethylenebisdithiocarbamic acid are brought together in relatively concentrated solutions. When, on the other hand, dilute solutions of the two kinds of salts are brought together, no precipitate occurs since the resulting product is freely soluble. For example, when two to three pounds of manganese sulfate is added to 100 gallons of water containing an equivalent amount of disodium ethylenebisdithiocarbamate, no precipitate is formed, but, on the other hand, when the same amounts of reactants are added to three gallons of water or less, a precipitate rapidly forms and can be isolated. This separated precipitate is the type of manganese ethylenebisdithiocarbamate which is identified as maneb.

We claim:
1. A water-insoluble metal complexed manganese ethylenebisdithiocarbamate giving on analysis 38% to 57.4% of carbon disulfide, having an X-ray powder diffraction diagram with characterizing lines with relative intensities at 8.04 A. (strong), 6.91 A. (medium), 6.51 A. (medium), 4.46 A. (medium-strong) and 3.03 A. (strong), containing from 13.8% to 20.7% of manganese, and containing as the said metal at least one member from the class consisting of cobalt, copper, iron and zinc, the percentage by weight of cobalt being about 0.25%–9%, copper being about 0.2%–2.5%, iron being about 0.1%–33%, and zinc being about 0.1%–6.6%.

2. A water-insoluble zinc complexed maneb giving on analysis 53% to 57.4% of carbon disulfide, having an X-ray powder diffraction diagram with lines with relative intensities at 8.04 A. (strong), 6.91 A. (medium), 6.51 A. (medium), 4.46 A. (medium-strong), and 3.03 A. (strong), containing 19.2% to 20.7% of manganese, and containing from 0.1% to 6.6% of zinc, percentages being by weight.

3. A water-insoluble cobalt complexed maneb giving on analysis 52% to 57.3% of carbon disulfide, having an X-ray powder diffraction diagram with lines with relative intensities at 8.04 A. (strong), 6.91 A. (medium), 6.51 A. (medium), 4.46 A. (medium-strong), and 3.03 A. (strong), containing 18.8% to 20.6% of manganese, and containing 0.25% to 9% of cobalt, percentages being by weight.

4. A water-insoluble copper complexed maneb giving on analysis 56% to 57.3% carbon disulfide, having an X-ray powder diffraction diagram with lines with relative intensities at 8.04 A. (strong), 6.91 A. (medium), 6.51 A. (medium), 4.46 A. (medium-strong) and 3.03 A. (strong), containing 20.2% to 20.6% manganese, and containing 0.2% to 2.5% copper, percentages being by weight.

5. A water-insoluble iron complexed maneb giving on analysis 52.3% to 57.4% of carbon disulfide, having an X-ray powder diffraction diagram with lines with relative intensities at 8.04 A. (strong), 6.91 A. (medium), 6.51 A. (medium), 4.46 A. (medium-strong), and 3.03 A. (strong), containing 18.8% to 20.7% manganese, and containing 0.1% to 9% iron, percentages being by weight.

6. A process for preparing complex metal bisdithiocarbamates which comprises mixing together water, water-insoluble manganese ethylenebisdithiocarbamate, and a water-soluble salt of a metal from the class consisting of cobalt, copper, iron, and zinc, and reacting said ethylenebisdithiocarbamate and said salt between 10° and 50° C., the ratio of said ethylenebisdithiocarbamate to water being from about 5:95 to 65:35 by weight and the proportion of a said salt to said ethylenebisdithiocarbamate being 0.25% to 10% of cobalt ion, 0.2% to 2.5% of copper ion, 0.1% to 10% of ferric ion, 1% to 50% of ferrous ion, and 0.1% to 7% of zinc ion based on the weight of the said manganense ethylenebisdithiocarbamate.

7. A process for preparing zinc complexed maneb which comprises mixing together water, water-insoluble manganese ethylenebisdithiocarbamate, and a water-soluble zinc salt and reacting said ethylenebisdithiocarbamate and zinc salt between 10° and 50° C., the ratio of said ethylenebisdithiocarbamate to water being 5:95 to 65:35 by weight, and the proportion of zinc ion from said salt to ethylenebisdithiocarbamate being 0.1% to 7% of zinc ion based on the weight of the said manganese ethylenebisdithiocarbamate.

8. A process for preparing cobalt complexed maneb which comprises mixing together water, water-insoluble manganese ethylenebisdithiocarbamate, and a water-soluble cobalt salt, and reacting said ethylenebisdithiocarbamate and cobalt salt between 10° and 50° C., the ratio of said ethylenebisdithiocarbamate to water being 5:95 to 65:35 by weight, and the proportion of cobalt ion from said salt to ethylenebisdithiocarbamate being 0.25% to 10% of cobalt ion based on the weight of the said manganese ethylenebisdithiocarbamate.

9. A process for preparing copper complexed maneb which comprises mixing together water, water-insoluble manganese ethylenebisdithiocarbamate, and a water-soluble copper salt, and reacting said ethylenebisdithiocarbamate and copper salt between 10° and 50° C., the ratio of said ethylenebisdithiocarbamate to water being 5:95 to 65:35 by weight, and the proportion of copper ion from said salt to ethylenebisdithiocarbamate being 0.2% to 2.5% of copper ion based on the weight of the said manganese ethylenebisdithiocarbamate.

10. A process for preparing ferric iron complexed maneb which comprises mixing together water, water-insoluble manganese ethylenebisdithiocarbamate, and a water-soluble ferric salt and reacting said ethylenebisdithiocarbamate and ferric salt between 10° and 50° C., the ratio of said ethylenebisdithiocarbamate to water being 5:95 to 65:35 by weight, and the proportion of ferric ion from said salt to ethylenebisdithiocarbamate being 0.1% to 10% of ferric ion based on the weight of the said manganese ethylenebisdithiocarbamate.

11. A process for preparing ferrous iron complexed maneb which comprises mixing together water, water-insoluble manganese ethylenebisdithiocarbamate, and a water-soluble ferrous salt and reacting said ethylenebisdithiocarbamate and ferrous salt between 10° and 50° C., the ratio of said ethylenebisdithiocarbamate to water being 5:95 to 65:35 by weight, and the proportion of ferrous ion from said salt to ethylenebisdithiocarbamate being 1% to 50% of ferrous ion based on the weight of the said manganese ethylenebisdithiocarbamate.

12. A method of reducing the phytotoxicity of manganese ethylenebisdithiocarbamate, said method comprising contacting said manganese ethylenebisdithiocarbamate, in the presence of water, with zinc ions.

13. A dry, fungicidal composition comprising manganese ethylenebisdithiocarbamate and a water-soluble zinc salt intermixed therewith.

14. A dry fungicidal composition comprising manganese ethylenebisdithiocarbamate and a water-soluble copper salt intermixed therewith.

15. A method of improving the fungicidal action of manganese ethylenebisdithiocarbamate, said method comprising contacting said manganese ethylenebisdithiocarbamate, in the presence of water, with copper ions.

16. A dry fungicidal composition comprising manganese ethylenebisdithiocarbamate and a water-soluble cobalt salt intermixed therewith.

17. A method of improving the fungicidal action of manganese ethylenebisdithiocarbamate, said method comprising contacting said manganese ethylenebisdithiocarbamate, in the presence of water, with cobalt ions.

18. A dry fungicidal composition comprising manganese ethylenebisdithiocarbamate and a water-soluble iron salt intermixed therewith.

19. A method of improving the fungicidal action of manganese ethylenebisdithiocarbamate, said method comprising contacting said manganese ethylenebisdithiocarbamate, in the presence of water, with ions.

References Cited
FOREIGN PATENTS 210,433   8/1960   Austria.

RICHARD L. HUFF, *Primary Examiner.*

A. LOUIS MONACELL, IRVING MARCUS,
*Examiners.*

S. J. BAICKER, E. FRANK, *Assistant Examiners.*

UNITED STATES PATENT OFFICE
CERTIFICATE OF CORRECTION

Patent No. 3,379,610  
April 23, 1968

Channing Bruce Lyon et al.

It is certified that error appears in the above identified patent and that said Letters Patent are hereby corrected as shown below:

Column 12, line 26, after "with" insert -- iron --.

Signed and sealed this 9th day of September 1969.

(SEAL)  
Attest:

Edward M. Fletcher, Jr.  
Attesting Officer

WILLIAM E. SCHUYLER, JR.  
Commissioner of Patents